United States Patent Office 3,357,956
Patented Dec. 12, 1967

3,357,956
POLYMERIC 1,3,4-THIADIAZOLES AND THE PROCESS FOR THEIR PREPARATION
August Henry Frazer, Wilmington, Del., assignor to E. I. du Pont de Nemours and Company, Wilmington, Del., a corporation of Delaware
No Drawing. Filed Mar. 30, 1965, Ser. No. 444,051
10 Claims. (Cl. 260—79)

This application is a continuation-in-part of U.S. application Ser. No. 229,741 filed Oct. 10, 1962, now abandoned.

This invention relates to novel and useful products and processes. More particularly, it relates to high molecular weight film- and fiber-forming nitrogen-containing condensation polymers which are characterized by high melting points and excellent chemical stability.

It is an object of this invention to prepare a novel class of high molecular weight nitrogen-containing polymeric materials which are characterized by high melting points and high resistance to degradation. More particularly, it is an object to provide a high molecular weight polymeric material which contains 1,3,4-thiadiazole rings as recurring units in the polymeric chain. A further object is to provide a process for the preparation of such polymers. A still further object is to provide shaped articles comprising these polymers. These and other objects will become apparent in the course of the following specification and claims.

In accordance with the present invention, a novel and useful high molecular weight polymer characterized by the presence of 1,3,4-thiadiazole rings as recurring units in the polymeric structure is provided. The polymeric 1,3,4-thiadiazole consists essentially of repeating units of the formula:

(I)
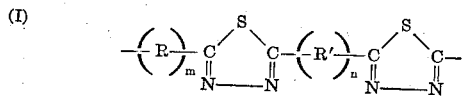

wherein R and R' are divalent hydrocarbon radicals containing up to 20 carbon atoms, m is 0 or 1 and n is 0 or 1, the number of said repeating units being sufficient to provide an inherent viscosity in concentrated sulfuric acid at 30° C. of at least about 0.2. Such a polymer is prepared by heating at a temperature between about 150° C. and the temperature at which decomposition occurs, for a period of from about one hour up to several days, a sulfur containing polyhydrazide, e.g. a polyoxathiahydrazide or polydithiahydrazide, consisting essentially of repeating units of the formula:

(II)
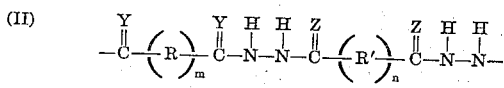

wherein R, R', m and n are as defined above, Y and Z are members of the class consisting of oxygen and sulfur, at least one of Y and Z being sulfur, the number of said repeating units being sufficient to provide a polymer capable of forming a self-supporting film, e.g. having an inherent viscosity in a suitable solvent at 30° C. of at least about 0.2. Suitable solvents are dimethyl sulfoxide, methanesulfonic acid, and sulfuric acid. The above defined sulfur containing polyhydrazides will be soluble in one, two, or all three of these solvents.

The reactivity difference between oxygen and sulfur in the preparation of a thiadiazole from a polyhydrazide as shown by Formula II wherein Y and Z are as therein defined and wherein oxygen is present, is such that the oxygen atom splits out with the two hydrogen atoms so that the sulfur is always left behind to form the thiadiazole ring.

The sulfur containing polyhydrazide (II) may be prepared by a reaction which proceeds in accordance with the following:

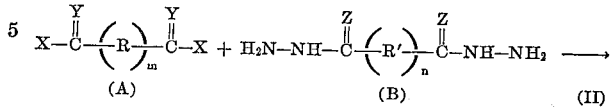

wherein R, R', m, n, Y and Z are as defined above and X is a member of the class consisting of halogen, such as chlorine and bromine; O-lower alkyl, such as methoxy and ethoxy; and S-lower alkyl, such as methio and ethio. The reactants are combined in substantially equimolar proportions in an inert solvent at a temperature between 0° C. and the normal boiling point of the solvent, in an inert atmosphere for a period, preferably, and between about 6 and 24 hours.

The following examples are intended to illustrate the present invention. They are not intended to limit it in any manner.

The inherent viscosities have been determined in all cases in accordance with the following formula:

$$\eta_{inh} = \frac{\ln \eta_{rel}}{c}$$

The relative viscosity ($\eta_{rel}$) may be determined by dividing the flow time in a capillary viscometer of a dilute solution of the polymer by the flow time for the pure solvent. The concentration c is generally 0.5 gram of polymer per 100 ml. of solution, and the measurements are made at a temperature of 30° C.

EXAMPLE 1

*Preparation of a polyoxathiahydrazide*

A mixture of 85 grams of N,N,N',N'-tetraethylisophthaldithioamide and 800 ml. of acetonitrile is heated to the temperature of reflux, and 52 grams of methyl iodide are added. After one hour of reflux, a second portion of 52 grams of methyl iodide is added and refluxing is continued for 18 hours. A precipitate is formed during this period. The precipitate is filtered, washed with ether and dried. The precipitate is suspended in one liter of methanol chilled in ice and saturated for 8 hours with hydrogen sulfide. After standing for 12 hours, the mixture is then resaturated with hydrogen sulfide for an additional 8 hours. After standing for 24 hours, the mixture is filtered and the solid residue is air dried and extracted with hot benzene. The resulting dimethyl tetrathioisophthalate exhibits a melting point of 75–76° C. after recrystallization from ethyl acetate.

The condensation of the above tetrathioester with a dihydrazide is effected by heating at a temperature of 80–85° C. with stirring for a period of 6 hours a mixture of 1.94 grams of isophthaloyl dihydrazide, 2.58 grams of dimethyl tetrathioisophthalate and 20 ml. of dimethyl sulfoxide under a nitrogen atmosphere. The resulting polymer is precipitated by pouring the solution into water, and is washed free of acid. The polymer is washed once with methanol and dried. The resulting polymer exhibits a polymer melt temperature in excess of 400° C. and an inherent viscosity of 0.53 in dimethyl sulfoxide at 30° C.

Infrared spectra of films of this polyoxathiahydrazide show NH, carbonyl, and C=S absorption. Elemental analyses for oxygen and sulfur agree closely with the theoretical values.

EXAMPLE 2

*Preparation of a polythiodiazole*

The polymer as prepared in Example 1, is soluble in dimethyl sulfoxide, and may be cast into a film from this solvent. The resulting film is converted, while retaining the film form, to poly-(1,3,4-thiadiazole) by heating to a temperature 185° C. for 24 hours at 0.5 mm. pressure. The sulfur analysis of the polymeric product corresponds closely with the calculated value.

The invention enables the formation of the polythiadiazole in the form of shaped articles such as films and the like. The polymer is not sufficiently soluble in dimethyl sulfoxide or other useful solvents to permit the casting of films directly.

EXAMPLE 3

Another polyoxathiahydrazide is prepared by the same procedure as Example 1 by condensing 2.58 grams of dimethyl tetrathioisophthalate with 1.4 grams of adipyl dihydrazide. The resulting polyhydrazide exhibits a polymer melt temperature of 350° C. and an inherent viscosity of 0.36 in dimethyl sulfoxide at 30° C. The resulting polymer is powdered and converted to the corresponding 1,3,4-thiadiazole by heating at a temperature of 185° C. for 21 hours at 0.5 mm. pressure. The polymer is soluble in concentrated sulfuric acid but not in dimethyl sulfoxide. It exhibits an inherent viscosity of 0.2 in concentrated sulfuric acid at 30° C. Elemental analyses agree closely with calculated values.

EXAMPLE 4

Another polyoxathiahydrazide is prepared by the same procedure as Example 1 by condensing 2.58 grams of dimethyl tetrathioisophthalate with 2.30 grams of sebacyl dihydrazide. The resulting copolyhydrazide exhibits a polymer melt temperature of 350° C., and an inherent viscosity of 0.33 in dimethyl sulfoxide at 30° C. The resulting polymer is powdered and converted to the corresponding 1,3,4-thiadiazole by heating at a temperature of 185° C. and a pressure of 0.5 mm. The polymer product is not soluble in dimethyl sulfoxide. It exhibits an inherent viscosity of 0.2 in concentrated acid at 30° C. Elemental analyses agree closely with calculated values.

EXAMPLE 5

Preparation of a polydithiahydrazide is accomplished by adding 3.44 grams dimethyl tetrathioisophthalate to a solution of 3.0 grams isophthaloyl dithiahydrazide in 100 ml. hexamethylphosphoramide. The solution that immediately forms is stirred at 60° C. for 170 hours to produce a suspension. Precipitation from water produces a polymer, whose melting point is 342° C. (dec.), inherent viscosity is 0.19 (methane-sulfonic acid), and whose infrared spectrum shows —NH and —C=S bands.

Another polydithiahydrazide is prepared by reacting terephthaloyl dithiahydrazide with dimethyl tetrathioterephthalate for 96 hours at 25–60° C. The polymer has a melting point in excess of 360° C. and an inherent viscosity of 0.31 in methanesulfonic acid. Treatment of the finely-divided polydithiahydrazide at 260° C. for 1 hour in air gives a granular polymer melting above 390° C. and exhibiting strong fluorescence diagnostic of the 1,3,4-thiadiazole polymer. The infrared spectrum is essentially devoid of NH absorption, but does exhibit C—S bands at 7.0 and 9.3μ.

As illustrative of reactant (A), above, are the diacyl or dithioacyl halides and the diesters, the dithioesters or perthioesters of the following acids: oxalic acid, malonic acid, succinic acid, glutaric acid, adipic acid, pimelic acid, suberic acid, azelaic acid, sebacic acid, and other higher members of this homologous series up to twenty or so carbon atoms, 1,4-cyclohexane-dicarboxylic acid, isophthalic acid, terephthalic acid, the naphthalene dicarboxylic acids as 1,3-naphthalene-dicarboxylic acid and 1,4-naphthalene-dicarboxylic acid and other similar dibasic acids which contain one or more aromatic nuclei. Also useful are the corresponding derivatives of the aliphatic-aromatic dibasic acids, as m- or p-phenylene diacetic acid, m- or p-phenylene dipropionic acid, and other similar members of this series.

Obviously, any of the above described derivatives of dibasic carboxylic acid may contain in addition, one or more inert substituents as methyl, ethyl, or other alkyl groups, chlorine or other halogen groups, nitro groups, etc. The derivatives of the dibasic acids as described above and the dihydrazides may contain a hetero atom in the ring or chain of atoms which separates the

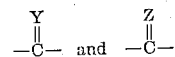

groups. Such hetero atoms may be nitrogen, oxygen or sulfur. Examples of such compositions containing hetero atoms include pyridine dibasic acids, such as pyridine-2,5-dicarboxylic acid; pyridine-2,6-dicarboxylic acid; the quinoline dibasic acids as quinoline-2,6-dicarboxylic acid; furan-2,5-dicarboxylic acid; pyrrole-2,5-dicarboxylic acid; thiophene-2,5-dicarboxylic acid and the like.

Reactant (B), above, may be the diacyl or dithioacyl dihydrazide of any of the acids of the above-mentioned non-hydrazide reactant. It is to be understood that copolyhydrazides are formed when R and R' are different, or when either R or R' represents a mixture of two or more choices for reactant (A) or (B). In a preferred embodiment, at least one of R and R' is aromatic.

The nature of the solvent is not critical providing it is substantially inert to the reactants and is one in which both reactants and final products are suitably soluble. Examples of suitable solvents are dimethylsulfoxide, dimethylacetamide, N-methylpyrrolidone and hexamethylphosphoramide.

The polyhydrazides or copolyhydrazides suitable for the instant invention ordinarily have inherent viscosities of at least about 0.2 and preferably of at least about 0.4 when measured in a suitable solvent such as dimethyl sulfoxide or methanesulfonic acid at 30° C. The melting points of these compositions (polyhydrazides) will be at least about 200° C. and preferably greater than about 300° C.

The polyhydrazide or copolyhydrazide is heated to effect the dehydration and/or dehydrosulfuration and conversion to the polymeric 1,3,4-thiadiazoles. The dehydration or dehydrosulfuration may be carried out by heat alone or the heating may be preceded by a chemical dehydration treatment with conventional dehydrating agents. The polyoxathiahydrazide or polythiahydrazide or copolymers thereof may be in the form of a powder or other random state of division or the conversion may be effected on a shaped structure, as a film, powder, fiber or the like. The process thus permits the preparation of shaped structures comprising polymeric 1,3,4-thiadiazoles, in the shaped form by shaping of the polyoxathiahydrazide or polydithiahydrazide precursor into the desired form followed by conversion to the corresponding thiadiazole. This is a great advantage in view of the fact that the high melting point and relative insolubility of many poly(1,3,4-thiadiazoles) render the shaping of these polymers by conventional procedures difficult and many times impractical. The length of time necessary for complete conversion varies with the nature of the polyhydrazide or copolyhydrazide and the physical form in which this polymer exists when the conversion is carried out. Thus, oriented films and fibers require a longer time for complete dehydration or dehydrosulfuration-cyclization than do unoriented films and fibers.

In general, polydithiahydrazides convert to poly(1,3,4-thiadiazoles) more readily than the corresponding polyoxathiahydrazides. Moreover the conversion of the sulfur-containing polyhydrazides occurs more readily than that of their non-sulfur containing counterparts. In any case the course of the reaction may be followed by periodic infrared analysis, indicating the disappearance of the carbonyl, thiocarbonyl, or imido bands and the concurrent appearance of the band characteristic of the 1,3,4-thiadiazole nucleus. A second means of following the course of the reaction exists in the periodic analysis of the polymer for oxygen content, where one of the starting materials contains oxygen. Sulfur analysis may also be employed to follow the course of the reaction. There is sufficient difference in the sulfur content between the polyhydrazide or copolyhydrazide and the resulting 1,3,4-thiadiazole polymer to make possible a determination of the extent of the reaction.

The thiadiazole polymers have melting points of at least about 300° C. and an inherent viscosity of at least about 0.2 when measured as described above. The preferred polymers have inherent viscosities and melting points of 0.4 and 400° C. respectively or higher.

Polymeric 1,3,4-thiadiazoles are characterized by high melting points, excellent stability to heat, light and hydrolytic conditions, high flex lives and toughness that render them especially useful in numerous applications, particularly in the form of films and fibers. The films may be used as drum liners, as outdoor coverings for the protection of perishable goods, and in numerous other applications. Fibers of the polymers of this invention may be woven or knit into fabrics which will retain their properties for extended periods, even in uses where other fibers rapidly deteriorate.

Many equivalent modifications will be apparent to those skilled in the art from a reading of the above without a departure from the inventive concept.

What is claimed is:

1. A high melting polymeric 1,3,4-thiadiazole which consists essentially of repeating units of the formula:

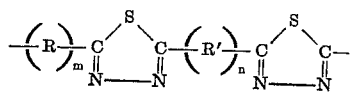

wherein R and R' are divalent hydrocarbon radicals containing up to 20 carbon atoms, $m$ is 0 or 1 and $n$ is 0 or 1, the number of said repeating units being sufficient to provide an inherent viscosity of at least about 0.2 in concentrated sulfuric acid at 30° C.

2. The polymer of claim 1 wherein $m$ and $n$ are both 1.

3. The polymer of claim 2 wherein R and R' are divalent aromatic radicals.

4. The polymer of claim 2 wherein R and R' are 1,3-phenylene.

5. The polymer of claim 2 wherein R is 1,3-phenylene and R' is $-(CH_2)_4-$.

6. The polymer of claim 2 wherein R is 1,3-phenylene and R' is $-(CH_2)_8-$.

7. The polymer of claim 2 wherein R and R' are 1,4-phenylene.

8. A polyhydrazide consisting essentially of repeating units of the formula:

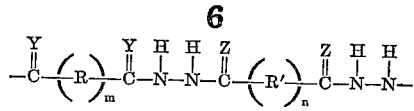

wherein R and R' are divalent hydrocarbon radicals containing up to 20 carbon atoms, $m$ is 0 or 1, $n$ is 0 or 1, and Y and Z are members of the class consisting of oxygen and sulfur, at least one of Y and Z being sulfur, the number of said repeating units being sufficient to provide an inherent viscosity of at least about 0.2 at 30° C. in at least one solvent of the group consisting of dimethyl sulfoxide, methane sulfonic acid, sulfuric acid.

9. A process for the preparation of a polymeric 1,3,4-thiadiazole having an inherent viscosity of at least about 0.2 in concentrated sulfuric acid at 30° C. and consisting essentially of repeating units of the formula:

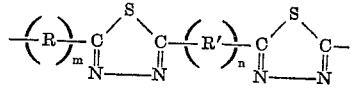

wherein R and R' are divalent hydrocarbon radicals containing up to 20 carbon atoms, $m$ is 0 or 1, and $n$ is 0 or 1; which comprises heating in the form of a shaped structure, a polyhydrazide consisting essentially of repeating units of the formula:

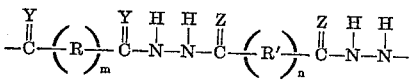

wherein R, R', $m$, and $n$ are as defined above and wherein Y and Z are members of the class consisting of oxygen and sulfur, at least one of Y and Z being sulfur, the number of said repeating units in said polyhydrazide being sufficient to provide an inherent viscosity of at least about 0.2 at 30° C. in at least one solvent of the group consisting of dimethyl sulfoxide, methane sulfonic acid, sulfuric acid, said heating being carried out at a temperature between 150° C. and the temperature at which decomposition occurs.

10. The process of claim 9 effected under reduced pressure.

References Cited

UNITED STATES PATENTS

| | | | |
|---|---|---|---|
| 2,615,862 | 10/1952 | MacFarlane | 260—78 |
| 3,130,182 | 4/1964 | Frazer | 260—78 |

FOREIGN PATENTS

| | | |
|---|---|---|
| 485,634 | 8/1952 | Canada. |
| 654,273 | 6/1951 | Great Britain. |
| 677,917 | 1/1964 | Canada. |

DONALD E. CZAJA, *Primary Examiner.*

LEON J. BERCOVITZ, *Examiner.*

M. I. MARQUIS, *Assistant Examiner.*